(12) United States Patent
Hosoda (10) Patent No.: US 10,631,016 B2
(45) Date of Patent: Apr. 21, 2020

(54) DYNAMIC RANGE COMPRESSION DEVICE AND IMAGE PROCESSING DEVICE

(71) Applicants: KABUSHIKI KAISHA TOSHIBA, Tokyo (JP); TOSHIBA ELECTRONIC DEVICES & STORAGE CORPORATION, Tokyo (JP)

(72) Inventor: Sohichiroh Hosoda, Kawasaki Kanagawa (JP)

(73) Assignees: KABUSHIKI KAISHA TOSHIBA, Tokyo (JP); TOSHIBA ELECTRONIC DEVICES & STORAGE CORPORATION, Tokyo (JP)

(*) Notice: Subject to any disclaimer, the term of this patent is extended or adjusted under 35 U.S.C. 154(b) by 115 days.

(21) Appl. No.: 15/908,790

(22) Filed: Feb. 28, 2018

(65) Prior Publication Data

US 2019/0089993 A1    Mar. 21, 2019

(30) Foreign Application Priority Data

Sep. 20, 2017 (JP) ................................. 2017-180520

(51) Int. Cl.
*H04N 19/98* (2014.01)
*H04N 19/186* (2014.01)
*H04N 1/60* (2006.01)

(52) U.S. Cl.
CPC ........... *H04N 19/98* (2014.11); *H04N 1/6058* (2013.01); *H04N 19/186* (2014.11)

(58) Field of Classification Search
CPC ..... H04N 19/98; H04N 1/6058; H04N 19/186
(Continued)

(56) References Cited

U.S. PATENT DOCUMENTS 6,463,173 B1   10/2002   Tretter
8,248,494 B2   8/2012    Du et al.
(Continued)

FOREIGN PATENT DOCUMENTS

EP    0772158 A2    5/1997
GB    2534929 A     8/2016
(Continued)

OTHER PUBLICATIONS

Extended European Search Report dated Aug. 17, 2018 in corresponding European Patent Application No. 18157346.0, 8 pages.

*Primary Examiner* — Jerome Grant, II
(74) *Attorney, Agent, or Firm* — Kim & Stewart LLP (57) ABSTRACT

A dynamic range compression device compresses multiple signal data pertaining to a common frame based on a total signal intensity range from multiple signals and limits compression of one or more signal data that are not saturated. The dynamic range compression device includes a total signal intensity circuit that calculates total intensity based on all of the signal data, a recalculation circuit that calculates a new compressed value for each signal data based on the calculation of total signal intensity to within a narrower range, a saturation circuit that determines whether one or more signal data after compression exceeds a predetermined value and are saturated signal data, and a data distribution circuit that decreases the value of the one or more saturated signal data and that increases the value of one or more non-saturated signal data.

18 Claims, 4 Drawing Sheets

(58) Field of Classification Search
USPC .......................................................... 382/166
See application file for complete search history.

(56) References Cited

U.S. PATENT DOCUMENTS

| | | | |
|---|---|---|---|
| 8,339,475 B2 | 12/2012 | Atanassov et al. | |
| 8,947,555 B2 | 2/2015 | Velarde et al. | |
| 8,982,963 B2 | 3/2015 | Gish et al. | |
| 9,230,509 B2 | 1/2016 | Van Der Vleuten | |
| 9,299,317 B2 | 3/2016 | Ward | |
| 9,432,588 B2* | 8/2016 | Svensson | H04N 5/2353 |
| 2003/0052895 A1 | 3/2003 | Akiyama et al. | |
| 2003/0103141 A1* | 6/2003 | Bechtel | G07C 5/0891 |
| | | | 348/148 |
| 2008/0100554 A1* | 5/2008 | Mori | G09G 3/3406 |
| | | | 345/89 |
| 2010/0061653 A1* | 3/2010 | Huang | G06T 5/007 |
| | | | 382/274 |
| 2013/0170019 A1* | 7/2013 | Teranishi | H01S 5/4006 |
| | | | 359/337.11 |
| 2013/0235070 A1* | 9/2013 | Webb | G09G 5/02 |
| | | | 345/594 |
| 2013/0258137 A1* | 10/2013 | Sakamoto | H04N 5/2621 |
| | | | 348/239 |
| 2013/0259321 A1* | 10/2013 | Aoki | G06K 9/00885 |
| | | | 382/115 |
| 2015/0348506 A1* | 12/2015 | Ooga | G09G 5/10 |
| | | | 345/205 |
| 2016/0038027 A1* | 2/2016 | Brzozowski | A61B 5/0059 |
| | | | 600/431 |
| 2016/0314371 A1* | 10/2016 | Wang | H04N 19/136 |
| 2018/0075588 A1 | 3/2018 | Hosoda | |
| 2018/0249059 A1* | 8/2018 | Jeong | H04N 5/2351 |
| 2019/0012776 A1* | 1/2019 | Liu | G06T 7/70 |
| 2019/0059845 A1* | 2/2019 | Osugi | A61B 6/566 |
| 2019/0079170 A1* | 3/2019 | Masuda | G01S 7/4865 |

FOREIGN PATENT DOCUMENTS

| | | |
|---|---|---|
| JP | 2012029029 A | 2/2012 |
| JP | 2012520619 A | 9/2012 |
| JP | 5254466 B2 | 8/2013 |
| JP | 5476793 B2 | 4/2014 |
| JP | 2014510339 A | 4/2014 |
| JP | 2015529890 A | 10/2015 |
| JP | 5964409 B2 | 8/2016 |

* cited by examiner

ND IMAGE PROCESSING DEVICE

DYNAMIC RANGE COMPRESSION DEVICE AND IMAGE PROCESSING DEVICE

CROSS-REFERENCE TO RELATED APPLICATION

This application is based upon and claims the benefit of priority from Japanese Patent Application No. 2017-180520, filed Sep. 20, 2017, the entire contents of which are incorporated herein by reference.

FIELD

Embodiments described herein relate generally to a dynamic range compression device and an image processing device.

BACKGROUND

In recent years, a high dynamic range (HDR) image has attracted attention and is in practical use. The HDR image has a high dynamic range by being generated by synthesizing images of a plurality of frames having different exposure times and the like.

There exists an HDR compression device which performs HDR compression processing on the HDR image. The HDR compression device is used for displaying the HDR image on a device (for example, a display device) having a low dynamic range and the like. In the HDR compression device, for example, 24-bit image data is compressed into 8-bit image data. In the HDR compression device, data compression is performed by reducing a dynamic range using information on a luminance value of a frame image.

In a case where the frame image has color data, for example, RGB data, when extreme deviation in RGB colors is not present in the frame image, a ratio between pixel values between RGB data is maintained and image data is compressed by converting a luminance value Y of each pixel into a luminance value Y1.

However, when extreme deviation in the RGB colors is present in an original frame image, there is a problem that when the pixel value of each color of RGB of each pixel is recalculated based on the luminance value Y1 after conversion, the ratio between the pixel values between the RGB data is not maintained and a luminance value after compression is significantly decreased.

For example, in a case where only the luminance value (for example, 24-bit data) of one specific color is large in the original image and the pixel values of other colors are low, when the pixel value of each color corresponding to the luminance value Y1 after data compression is recalculated, only the color data of one specific color becomes large and overflow occurs in an internal register because the pixel values of the other colors are low, and as a result, the luminance value of the pixel is decreased significantly, so that the pixel may become like a black dot in some cases.

DETAILED DESCRIPTION

Embodiments provide a dynamic range compression device and an image processing device which do not cause a decrease in a luminance value after data compression even when extreme deviation in colors is present in a frame image.

In general, according to an embodiment, there is provided a dynamic range compression device which compresses multiple signal data pertaining to a common frame based on a total signal intensity range from multiple signals and that limits compression of one or more signal data that are not saturated. The dynamic range compression device includes a total signal intensity circuit that calculates total intensity based on all of the signal data, a recalculation circuit that calculates a new compressed value for each signal data based on the calculation of total signal intensity to within a narrower range, a saturation circuit that determines whether one or more signal data after compression exceeds a predetermined value and are saturated signal data, and a data distribution circuit that decreases the value of the one or more saturated signal data and that increases the value of one or more non-saturated signal data.

First Embodiment

In the following, embodiments will be described with reference to the drawings.

Configuration

Figure 1:
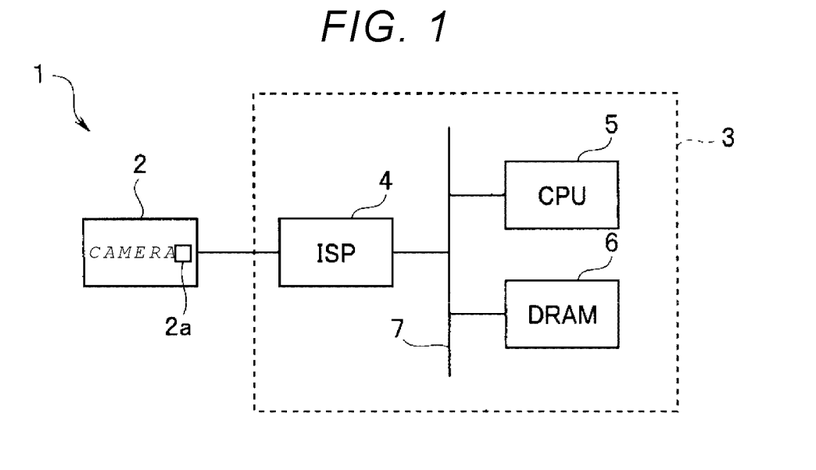
FIG. 1 is a block diagram of an image processing system according to a first embodiment of the present disclosure.

FIG. 1 is a block diagram of an image processing system 1 according to a first embodiment.

The image processing system 1 includes a camera 2 having an imaging element 2a such as a CMOS image sensor and an image processing device 3 that receives an imaging signal from the camera 2 and performs predetermined image processing. The image processing system 1 is, for example, an apparatus that performs target recognition from an image of the camera 2.

The image processing device 3 is installed as a semiconductor device on various equipment, performs image recognition processing on an image obtained by the camera, and outputs recognition result information.

The camera 2 can drive the imaging element 2a to output imaging signals of a still image and a moving image and also output imaging signals of a plurality of frames having mutually different exposure times.

The image processing device 3 is a semiconductor device, which includes an image signal processor (in the following, referred to as ISP) 4, a central processing unit (in the following, referred to as CPU) 5, and a DRAM 6 as a main memory, that is, a semiconductor chip. The image processing device 3 receives an imaging signal from the camera 2 via an interface circuit (not illustrated).

The camera 2 and the image processing device 3 perform communication according to, for example, the MIPI protocol, and the image processing device 3 receives the imaging signal from the camera 2. The ISP 4, the CPU 5, and the DRAM 6 are connected via a bus 7 so as to allow data to be transmitted and received.

The ISP 4 receives the imaging signal from the camera 2, performs HDR synthesizing processing and HDR compression processing on the imaging signal, and outputs compressed image data to the DRAM 6 via the bus 7.

The CPU 5 performs predetermined image processing on image data stored in the DRAM 6 and stores a result of the image processing in the DRAM 6. For example, the CPU 5 reads image data stored in the DRAM 6, performs image recognition processing on the image data, and writes information about a recognized target in a predetermined region of the DRAM 6. Information about the target is read out via the bus 7 by a device not illustrated and is used for various recognition processing such as object recognition and character recognition.

Figure 2:
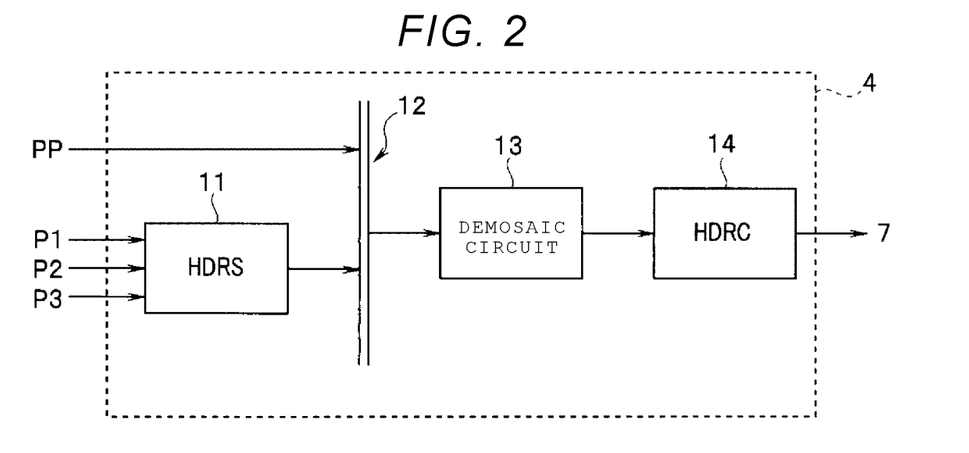
FIG. 2 is a block diagram illustrating a configuration of an image signal processor according to the first embodiment of the present disclosure.

FIG. 2 is a block diagram illustrating a configuration of the ISP 4.

The ISP 4 includes an HDR synthesizing circuit (in the following, referred to as HDRS) 11, a selector 12, a demosaic circuit 13, and an HDR compression circuit (in the following, referred to as HDRC) 14.

The HDRS 11 receives image signals P1, P2, and P3 of a plurality of (here, three) frames having mutually different exposure times from the camera 2, performs HDR synthesizing processing, and outputs the image signals to the selector 12. The image signals P1, P2, P3 are, for example, 16-bit image signals of respective pixel values of a Bayer filter of the imaging element 2a of the camera 2. The HDRS 11 performs HDR synthesis and outputs a 24-bit image signal.

The selector 12 selects an image signal from the HDRS 11 and outputs the image signal to the demosaic circuit 13.

Here, the selector 12 can select either the image signal PP from the camera 2 or the image signal of the HDRS 11, and output the selected image signal to the demosaic circuit 13. This is for making it possible to correspond to the image signal PP output from the camera in a case where the camera 2 itself has an HDR synthesizing processing circuit.

The demosaic circuit 13 performs demosaic processing on the image signal of the HDRS 11, generates a 24-bit RGB image signal for each pixel, and outputs the image signal to the HDRC 14.

The HDRC 14 performs HDR compression processing on the RGB image signal by local tone mapping and outputs a compressed image signal. For example, a 24-bit RGB image signal is compressed and converted into a 16-bit RGB image signal.

The image signal generated in the HDRC 14 is stored in the DRAM 6 and various processing is performed on the image signal by the CPU 5.

Figure 3:
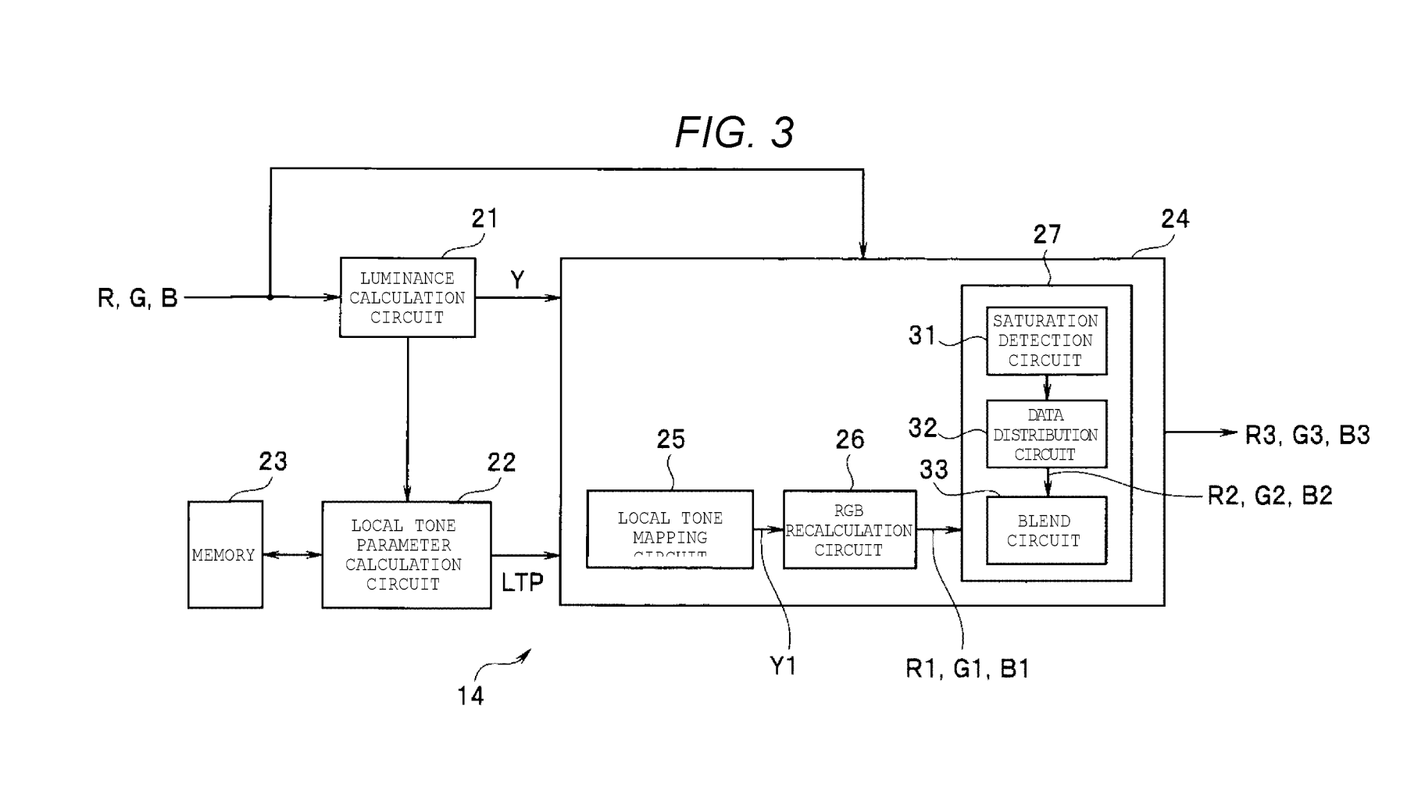
FIG. 3 is a block diagram illustrating a configuration of an HDR compression circuit according to the first embodiment of the present disclosure.

FIG. 3 is a block diagram illustrating a configuration of the HDRC 14.

The HDRC 14 includes a luminance calculation circuit 21, a local tone parameter calculation circuit 22, a memory 23, and a local tone mapping processing circuit 24.

The HDRC 14 performs HDR compression processing on, for example, the 24-bit RGB image signal output from the demosaic circuit 13, and outputs a compressed image signal (for example, 16-bit).

The luminance calculation circuit 21 calculates a luminance value of each pixel of a frame image. Specifically, the luminance calculation circuit 21 is a circuit that calculates the luminance value of each pixel from image signals of three colors of RGB. A luminance value Y is calculated from the following expression (1).

$$Y = Cr*R + Cg*G + Cb*B \qquad (1)$$

Cr, Cg and Cb are coefficients and have a relationship of Cr+Cg+Cb=1.

The luminance calculation circuit 21 outputs the luminance value of each pixel of each frame. As a result, the luminance calculation circuit 21 is a luminance image generation circuit which outputs a luminance image composed of luminance values of pixels.

The local tone parameter calculation circuit 22 is a circuit for calculating a local tone parameter LTP of a frame image. Specifically, the local tone parameter calculation circuit 22 calculates the local tone parameter LTP as a correction parameter of a tone curve for local tone mapping based on brightness distribution Or illumination distribution in the frame image, and outputs the local tone parameter LTP to the local tone mapping processing circuit 24.

For example, the local tone parameter calculation circuit 22 divides the frame image into a plurality of predetermined regions and obtains brightness distribution in the frame image. Then, the local tone parameter calculation circuit 22 extracts the local tone parameter of each pixel based on information of the brightness distribution around each pixel.

The memory 23 is a memory for temporarily storing brightness distribution information of the previous frame image as brightness distribution information of the frame image to be used in the local tone parameter calculation circuit 22. Accordingly, when the local tone parameter of each pixel is calculated in a case where brightness distribution information of the previous frame image is required, the local tone parameter calculation circuit 22 refers to information stored in the memory 23.

When the local tone parameter of each pixel is extracted, the local tone parameter calculation circuit 22 uses the brightness distribution of the previous frame image stored in the memory 23 for a region where brightness distribution information of the current frame image cannot be obtained.

The local tone mapping processing circuit 24 includes a local tone mapping circuit 25, an RGB recalculation circuit 26, and a luminance correction circuit 27.

The local tone mapping circuit 25 converts an original luminance value (for example, 24-bit) of each pixel of the frame image into a luminance value of a low dynamic range by tone mapping using predetermined tone curve information based on the local tone parameter LTP from the local tone parameter calculation circuit 22.

Here, two tone curves are prepared and the luminance value of each pixel is converted based on a tone curve obtained by blending the two tone curves, based on the local tone parameter LTP.

Figure 4:
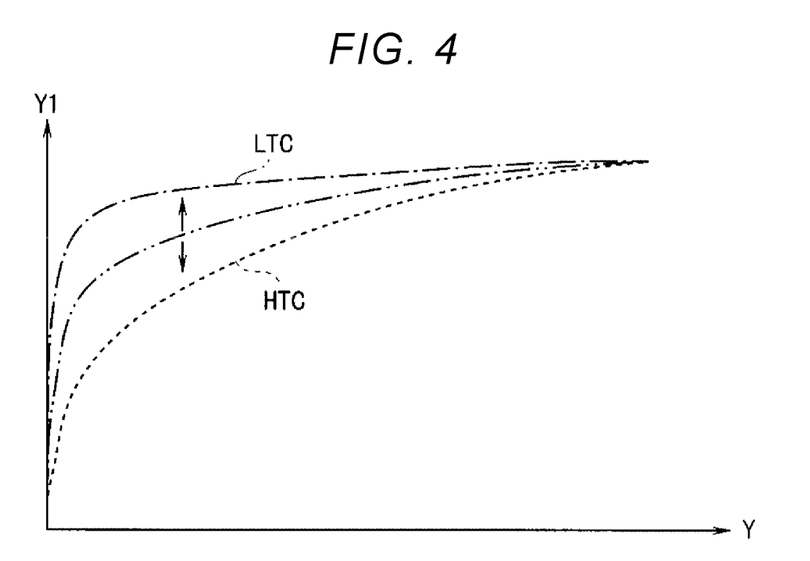
FIG. 4 is a diagram for explaining blending of two tone curves based on a local tone parameter LTP according to the first embodiment of the present disclosure.

FIG. 4 is a diagram that shows the blending of two tone curves based on the local tone parameter LTP. The horizontal axis represents the luminance value Y of a pixel before compression and the vertical axis represents the luminance value Y1 of the pixel after compression.

The local tone mapping circuit 25 holds information on two tone curves LTC and HTC. In FIG. 4, the tone curve LTC indicated by a single-dashed line is a tone curve for a low luminance region, and the tone curve HTC indicated by a dotted line is a tone curve for a high luminance region. The tone curve LTC is set such that the luminance value of the low luminance region is increased and the tone curve HTC is set such that the luminance value of the high luminance region is decreased.

The local tone parameter LTP used to blend the curves, comprises information about brightness distribution of a peripheral region of each pixel and indicates a blending ratio between the tone curve LTC for the low luminance region and the tone curve HTC for the high luminance region according to brightness distribution of the peripheral region. In FIG. 4, a tone curve indicated by a double dot-dashed line is a blended tone curve. The local tone parameter LTP is determined in such a way that when the peripheral region of the pixel is bright as a whole, LTP becomes close to the tone curve HTC. When the peripheral region of the pixel is dark as a whole, LTP becomes close to the tone curve LTC, and when the dark peripheral region of the pixel and the bright peripheral region of the pixel coexist, LTP is intermediate between the tone curve LTC and the tone curve HTC.

The local tone mapping circuit 25 determines a tone curve obtained by blending the tone curve LTC for the low luminance region and the tone curve HTC for the high luminance region based on the local tone parameter LTP, and compresses the luminance value of each pixel based on the determined tone curve.

The RGB recalculation circuit 26 recalculates the pixel value of each color of RGB of each pixel, which corresponds to the low dynamic range, from the luminance value converted by the local tone mapping circuit 25.

That is, the pixel value of each color of RGB is obtained through an inverse operation by the RGB recalculation circuit 26 in accordance with the luminance value compressed by the local tone mapping circuit 25.

In the related art, a frame image signal of RGB obtained by the RGB recalculation circuit 26 is output as an HDR compressed image signal to a display device or the like.

However, the local tone mapping processing circuit of the first embodiment includes a luminance correction circuit 27, and luminance correction is performed on the frame image signal of RGB obtained by the RGB recalculation circuit 26.

In the following, RGB signals output from the RGB recalculation circuit 26 are referred to as R1 signal, G1 signal, and B1 signal.

The luminance correction circuit 27 includes a saturation detection circuit 31, a data distribution circuit 32, and a blend circuit 33.

The saturation detection circuit 31 is a circuit for determining whether a pixel value of each of color signals R1, G1, and B1 output from the RGB recalculation circuit 26 exceeds a saturation value (maximum value) or not.

That is, the saturation detection circuit 31 detects saturation of each color data for each pixel according to whether a value of color data of each pixel of the frame image converted from color data corresponding to the first luminance dynamic range (for example, 24-bit) to color data corresponding to the second luminance dynamic range (for example, 16-bit) exceeds a predetermined saturation value (saturation value sat_val to be described later) or not.

When a saturated color signal is detected by the saturation detection circuit 31, the data distribution circuit 32 responds by decreasing the pixel value of the saturated color and increasing the pixel value of the non-saturated color and outputs the saturation value of the saturated color signal and a pixel value of a color signal after adjustment of the non-saturated color signal.

That is, the data distribution circuit 32 calculates a data amount necessary for a pixel for which saturation is detected to maintain a luminance value in a state of not being saturated and distributes and outputs the calculated data amount to modify other non-saturated color data which is not saturated other than saturated color data for which saturation is detected in the pixel for which saturation is detected.

In the following, the R signal, the G signal, and the B signal output from the data distribution circuit 32 are referred to as an R2 signal, a G2 signal, and a B2 signal, respectively.

The blend circuit 33 performs blending of the R1, G1, and B1 signals output from the RGB recalculation circuit 26 and the R2, G2, B2 signals output from the data distribution circuit 32.

The local tone mapping processing circuit 24 outputs RGB image signals blended in the blend circuit 33.

Next, processing of the data distribution circuit 32 will be described in detail.

Figure 5:
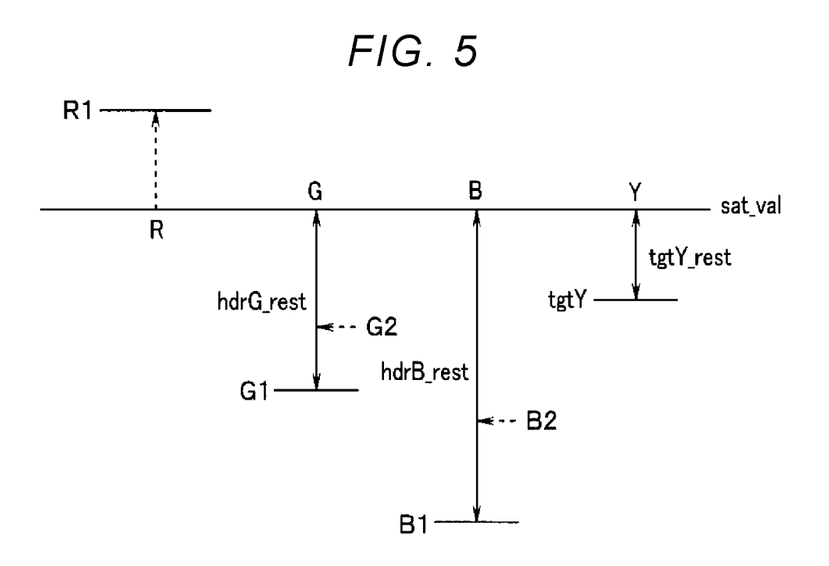
FIG. 5 is a diagram for explaining distribution of pixel values of RGB signals according to the first embodiment of the present disclosure.

FIG. 5 is a diagram for explaining distribution of pixel values of RGB signals. Here, an example in which a signal of R1 (red) exceeds the saturation value sat_val is illustrated. The vertical axis in FIG. 5 indicates pixel values of R, G, and B of a pixel, or a luminance value of the pixel.

In FIG. 5, the saturation value sat_val is the maximum value of a pixel value (for example, 16-bit) after compression of the pixel calculated by the local tone mapping circuit 25, that is, a saturation value. A luminance value tgtY is the luminance value Y1 of the pixel compressed in the local tone mapping circuit 25.

A tgtY_rest indicates a difference between a luminance value tgtY (=Y1) after HDR compression and the saturation value sat_val.

A hdrG_rest indicates a difference between a pixel value of the G1 signal after compression and the saturation value sat_val, in other words, a margin value up to the saturation value sat_val of the G1 signal. Similarly, a hdrB_rest indicates a difference between a pixel value of the B1 signal after compression and the saturation value sat_val, in other words, a margin value up to the saturation value sat_val of the B1 signal.

First, the data distribution circuit 32 calculates the hdrY_rest using the following expression (2).

$$\text{hdrY\_rest}=((Cg*\text{hdrG\_rest})+(Cb*\text{hdrB\_rest})) \quad (2)$$

The hdrY_rest is a data value capable of allowing the luminance value Y1 of the color signals (here, G1 signal and B1 signal) which are not saturated to increase by using coefficients (here, Cg and Cb) in the luminance value of the HDR signal, that is, the maximum increasable amount in the non-saturated color signal.

Furthermore, the data distribution circuit 32 calculates an adjustment gain adj_gain using the following expression (3) using the hdrY_rest and tgtY_rest.

$$\text{adj\_gain}=(\text{tgtY\_rest}/\text{hdrY\_rest}) \quad (3)$$

In the data distribution circuit 32, a pixel value correction amount of two non-saturated color signals (here, G1 signal and B1 signal) is calculated from the adjustment gain adj_gain using the following expressions (4) and (5). The adjustment gain adj_gain is a value smaller than 1.

$$\text{adjG\_rest}=(\text{hdrG\_rest}*\text{adj\_gain}) \quad (4)$$

$$\text{adjB\_rest}=(\text{hdrB\_rest}*\text{adj\_gain}) \quad (5)$$

In the data distribution circuit 32, corrected pixel values G2 and B2 of two non-saturated color signals (here, G1 signal and B1 signal) are calculated using the following expressions (6) and (7).

$$G2=(\text{sat\_val}-\text{adjG\_rest}) \quad (6)$$

$$B2=(\text{sat\_val}-\text{adjB\_rest}) \quad (7)$$

The signals of G2 and B2 calculated by the expressions (6) and (7) and the R2 signal having the saturation value are output from the data distribution circuit 32.

Accordingly, in a case where the R1 signal described above is saturated, the G1 signal and the B1 signal are corrected so as to increase using the adjustment gain adj_gain to become the G2 signal and the B2 signal. In other words, from the expressions (2) to (7), data of non-saturated colors G2 and B2 may be regarded as values adjusted so as not allow the luminance value to decrease even when R1 of the saturated color is saturated.

As described above, the data distribution circuit 32 calculates a data amount necessary for the pixel for which saturation is detected to maintain a luminance value in a state of not being saturated from data in accordance with the difference up to the predetermined saturation value sat_val of other non-saturated color data and distributes the calculated data amount to other non-saturated color data. In the example described above, the frame image includes three color data of RGB and the data distribution circuit 32 calculates the data amount necessary for the pixel for which saturation is detected to maintain a luminance value in a state of not being saturated from data in accordance with the difference up to the saturation value sat_val regarding other two color data other than one color data of the three color data when a value of the one color data of the three color data exceeds the predetermined saturation value sat_val and distribute the calculated data amount to the other two color data which is the other non-saturated color data.

The data distribution circuit 32 calculates the data amount necessary for the pixel for which saturation is detected to maintain a luminance value in a state of not being saturated from data in accordance with the difference up to the saturation value sat_val regarding other one color data other than two color data of three color data when values of the two color data of the three color data exceed the predetermined saturation value sat_val and distribute the calculated data amount to the other one color data which is the other non-saturated color data.

The data distribution circuit 32 outputs the R2 signal having the saturation value (sat_val) and the G2 signal and B2 signal calculated by the expressions (6) and (7) to the blend circuit 33.

The blend circuit 33 receives the R1 signal, the G1 signal, the B1 signal (image signals before luminance correction) from the RGB recalculation circuit 26 and the R2 signal, the G2 signal, the B2 signal from the data distribution circuit 32 (image signals after luminance correction) and blends the image signals before luminance correction and the image signals after luminance correction based on a set blend coefficient OrgYbld.

Here, the blend coefficient OrgYbld is any numeric value between 0 and 1024, and indicates an amount of a pixel value of each of colors of the R1 signal, the G1 signal, and the B1 signal from the RGB recalculation circuit 26 to be blended.

The blend circuit 33 outputs a R3 signal, a G3 signal, and a B3 signal as image signals obtained by blending the image signals before luminance correction and the image signals after luminance correction, based on the following expressions (8) to (10)

$$R3=((OrgYbld*R1)+((1024-OrgYbld)*R2))>>10 \quad (8)$$

$$G3=((OrgYbld*G1)+((1024-OrgYbld)*G2))>>10 \quad (9)$$

$$B3=((OrgYbld*b1)+((1024-OrgYbld)*B2))>>10 \quad (10)$$

Here, ">>10" indicates a right shift of data and it is indicated that "1024" is used as a blend coefficient and thus, each pixel value is divided by 1024 by being subjected to right shift by 10 digits.

When a value of the blend coefficient OrgYbld is increased, the image including the R3 signal, the G3 signal, and the B3 signal can be an image having a color close to a color that the original image has. When the value of the blend coefficient OrgYbld is decreased, luminance of the image including the R3 signal, the G3 signal, and the B3 signal is increased.

As described above, the blend circuit 33 blends color data R1, G1, and B1 of each pixel of the second luminance dynamic range (16-bit) and non-saturated color data R2, G2, and B2 to which the data amount calculated by the data distribution circuit 32 is distributed for each color of each pixel based on the set blend parameters.

The value of the blend coefficient OrgYbld is adjusted to thereby make it possible to adjust a degree of influence of the image signal before luminance correction.

As described above, in the first embodiment, it is possible to maintain the luminance value Y1 after compression by increasing the pixel value of the non-saturated color in the luminance correction circuit 27.

Figure 6:
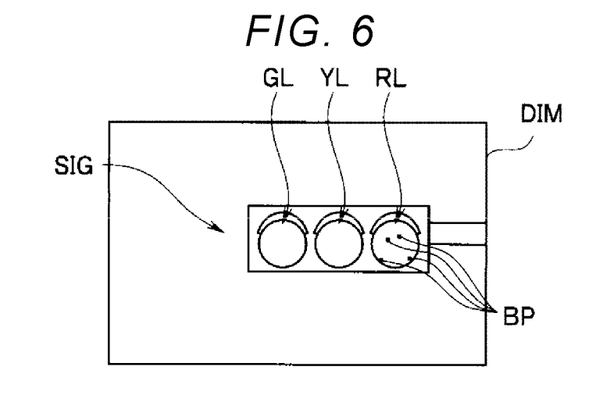
FIG. 6 is a diagram illustrating an example of a displayed image when luminance correction is not performed in a local tone mapping processing circuit.

FIG. 6 is a diagram illustrating an example of a displayed image when luminance correction is not performed in the local tone mapping processing circuit 24. FIG. 6 illustrates an example of an image DIM, which is displayed on a display device, of a traffic light installed on a road. A traffic light SIG has three lamps of three colors, that is, green, yellow and red.

When the image DIM is an image in which only the color of the red signal RL is strong, other colors are extremely weak, and extreme deviation in colors is present, the luminance value of the recalculated pixel may significantly decrease and a black spot BP may appear in the image DIM as illustrated in FIG. 5, in a case of a device of the related art not including the luminance correction circuit 27.

However, according to the first embodiment described above, the local tone mapping processing circuit 24 performs luminance correction for increasing a pixel value of the non-saturated pixel and outputs color signals of RGB and thus, occurrence of black spots BP is prevented as illustrated in FIG. 6.

In the example described above, the description has been made on a case where luminance correction is performed on the G signal and the B signal when the R signal is saturated among three colors of RGB. Luminance correction is performed on two color signals (R signal and B signal, or R signal and G signal) other than the G signal (or B signal) when the G signal (or B signal) other than the R signal among three colors of RGB is saturated.

As described above, according to the first embodiment, it is possible to provide a dynamic range compression device and an image processing device which do not cause a decrease in a luminance value after data compression even when extreme deviation in colors is present in the frame image.

Second Embodiment

In the first embodiment, the pixel value of the non-saturated pixel is adjusted using the ratio of the margin value up to the saturation value of the pixel value of the non-saturated pixel which is not saturated and the luminance value after HDR compression. In the second embodiment, adjustment is performed so that an amount exceeding the predetermined saturation value is added to a pixel value of a pixel having a prescribed non-saturated color.

Figure 7:
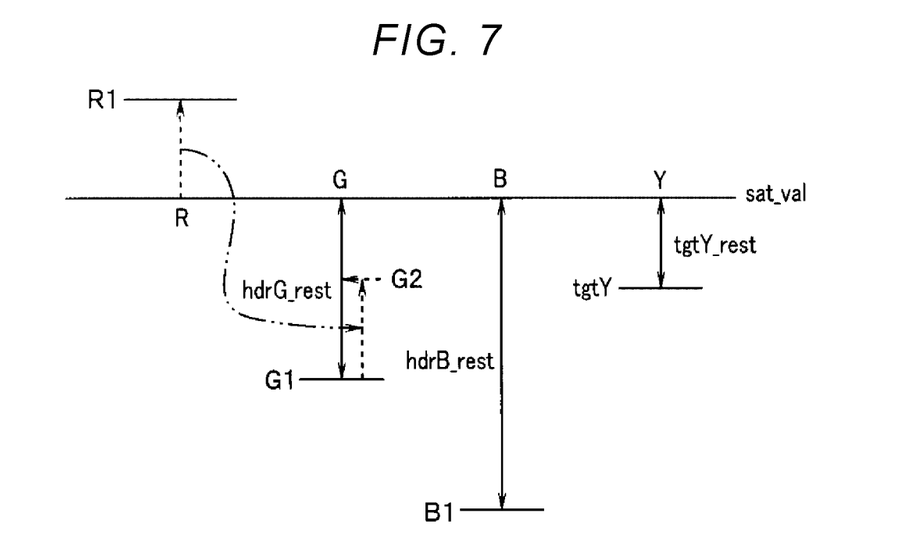
FIG. 7 is a diagram for explaining distribution of pixel values of RGB signals according to a second embodiment of the present disclosure.

FIG. 7 is a diagram for explaining distribution of pixel values of RGB signals. Here, an example in which the signal of R1 (red) exceeds the saturation value sat_val is illustrated.

The data distribution circuit 32 adds an amount (indicated by a dotted line) exceeding the saturation value sat_val of the R1 signal to a pixel value of a predetermined non-saturated color (here, when R1 exceeds saturation value sat_val, G1).

That is, in the second embodiment, the data distribution circuit 32 adds the predetermined saturation value sat_val of saturated color data for which saturation is detected to other non-saturated color data by the amount of saturation exceeding the saturation value sat_val, as a portion of the saturated color data.

As a result of adding the amount (amount indicated by the dotted line) exceeding the saturation value sat_val of the R1 signal to the pixel value of a predetermined non-saturated color (here, G1), when the predetermined color (here, G1) also exceeds the saturation value sat_val, an amount exceeding the saturation value sat_val of the G1 signal is added to the B1 signal.

As described above, the frame image includes three color data of RGB and the data distribution circuit 32 adds data in accordance with an amount that a value of one color data exceeds the predetermined saturation value to one or two of the other non-saturated color data as a portion of the saturated color data when a value of the one color data of the three color data exceeds the predetermined saturation value.

Furthermore, in a case where a non-saturated pixel of two colors is present, an amount exceeding the saturation value may be distributed to color data of the non-saturated pixel of two colors at a predetermined ratio.

Other processing is the same as in the first embodiment, and the second embodiment also has the same effect as the first embodiment.

In the two embodiments described above, the description has been made on a case where luminance correction is performed on the other two color data when one color data of three colors of RGB is saturated. When two color data of the three colors of RGB is saturated, luminance correction is performed on remaining one color data.

As described above, according to the two embodiments described above, it is possible to provide a dynamic range compression device and an image processing device which do not cause a decrease in a luminance value after data compression even when extreme deviation in colors is present in a frame image.

As a result, an image processing system including the above dynamic range compression device and the image processing device can accurately perform various recognition processing such as object recognition or character recognition.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A dynamic range compression device that compresses multiple signal data pertaining to a common frame based on a total signal intensity range from multiple signals and that limits compression of one or more signal data that are not saturated, comprising:
    a total signal intensity circuit that calculates total intensity based on all of the signal data;
    a recalculation circuit that calculates a new compressed value for each signal data based on the calculation of total signal intensity to within a narrower range;
    a saturation circuit that determines whether one or more signal data after compression exceeds a predetermined value and are saturated signal data; and
    a data distribution circuit that decreases the value of the one or more saturated signal data and that increases the value of one or more non-saturated signal data.

2. The dynamic range compression device according to claim 1, wherein after the compression, the total signal intensity before distribution by the distribution circuit is the same as the total signal intensity after the distribution by the distribution circuit.

3. The dynamic range compression device according to claim 1, wherein the signals are red, blue and green sensed signals from an optical device that are grouped together in a pixel.

4. The dynamic range compression device according to claim 3, further comprising:
    a blend circuit that blends color data of each pixel from the data distribution circuit to form a compressed luminance dynamic range based on a set blend parameter.

5. The dynamic range compression device according to claim 3, wherein the data distribution circuit increases the value of the one or more unsaturated signal data of the pixel in which saturation is detected.

6. The dynamic range compression device according to claim 5,
    wherein the data distribution circuit calculates a difference between the one or more saturated signal data and the one or more non-saturated signal data, and adds more than this calculated difference to the one or more non-saturated signal data.

7. The dynamic range compression device according to claim 6,
    wherein the frame image includes three color data of RGB, and wherein the data distribution circuit calculates a difference between the one or more saturated signal data and the one or more non-saturated signal data, and adds less than this calculated difference to the one or more non-saturated signal data.

8. The dynamic range compression device according to claim 1,
    wherein the data distribution circuit calculates a difference between the one or more saturated signal data and the predetermined value, and adds this calculated difference to the one or more non-saturated signal data.

9. The dynamic range compression device according to claim 1,
    wherein the data distribution circuit calculates a difference between the one or more saturated signal data and the one or more non-saturated signal data, and adds this calculated difference to the one or more non-saturated signal data.

10. A dynamic range compression device comprising:
    a saturation detection circuit that detects saturation of luminance of first, second, and third color in a frame image converted from color data having a first luminance range to color data having a second luminance range, which is narrower than the first luminance range;

a data distribution circuit that calculates a data amount available for representing luminance of each of the first, second, and third colors in the converted frame image, such that the data amount available for representing the luminance of at least one of the first and second colors is increased if saturation is detected in the luminance of the third color and not detected in the first and second colors; and a blend circuit that blends, based on a set blend parameter, for each pixel of the image, the color data having the second luminance dynamic range and color data of said at least one of the first and second colors in which no saturation is detected and the data amount is increased.

11. The dynamic range compression device according to claim 10, wherein the data distribution circuit calculates the data amount from data corresponding to a difference of unsaturated color data up to a predetermined saturation value such that the data amount for the unsaturated color data is increased.

12. The dynamic range compression device according to claim 11, wherein the frame image includes three color data of RGB, and when a value of one or two color data of the three color data exceeds the predetermined saturation value, the data distribution circuit calculates the data amount from data in accordance with a difference of color data other than the one or two color data of the three color data up to the predetermined saturation value such that the data amount for the color data other than the one or two color data is increased.

13. The dynamic range compression device according to claim 10, wherein the saturation detection circuit detects saturation of each color data for each pixel in the converted frame image depending on whether a value of the each color data exceeds a predetermined saturation value; and the data distribution circuit adds a difference between saturated color data and the predetermined saturation value to unsaturated color data in the pixel in which saturation is detected.

14. A dynamic range compression device that compresses multiple sensed luminance signal data pertaining to a common frame based on a total signal intensity range from the multiple signals and that limits compression of one or more colored signals that are not saturated despite saturation of one or more signals, comprising:

a total signal intensity circuit that calculates total intensity based on all of the signals;

a memory for temporarily storing brightness distribution information of a previous frame image as brightness distribution information of the frame image;

a luminance calculation circuit that calculates a signal luminance value of each pixel of a frame image; and a local tone parameter calculation circuit that uses the brightness distribution of the previous frame image stored in the memory for a region where brightness distribution information of a current frame image cannot be obtained, wherein an original luminance value of each pixel of the frame image is converted into a luminance value of a low dynamic range by tone mapping using predetermined tone curve information based on a local tone parameter LTP from the local tone parameter calculation circuit, and a luminance correction circuit that increases luminance value of data of a color signal pixel in a brightness region when the luminance value of data of a different color signal pixel exceeds a predetermined threshold.

15. The dynamic range compression device according to claim 14, wherein the luminance correction circuit comprises a data distribution circuit that calculates a data amount for correction from data corresponding to a difference of a non-saturated color data up to a predetermined saturation value and distributes the calculated data amount to other non-saturated color data.

16. The dynamic range compression device according to claim 15, wherein the data distribution circuit calculates a difference between the one or more saturated signal data and the one or more non-saturated signal data, and adds more than this calculated difference to the one or more non-saturated signal data.

17. The dynamic range compression device according to claim 15, wherein the frame image includes three color data of RGB, and wherein the data distribution circuit calculates a difference between the one or more saturated signal data and the one or more non-saturated signal data, and adds less than this calculated difference to the one or more non-saturated signal data.

18. The dynamic range compression device according to claim 15, further comprising:

a blend circuit that blends color data of each pixel of the compressed luminance range and color data of the non-saturated color to which data amount calculated by the data distribution circuit is distributed for each color of each pixel based on a set blend parameter.

* * * * *